(12) United States Patent
Hikida et al.

(10) Patent No.: US 12,108,695 B2
(45) Date of Patent: Oct. 8, 2024

(54) AUTOMATIC TRAVEL SYSTEM

(71) Applicant: Yanmar Power Technology Co., Ltd., Osaka (JP)

(72) Inventors: Yasutaka Hikida, Osaka (JP); Shoichi Nakamura, Osaka (JP); Shinsuke Ozaki, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 352 days.

(21) Appl. No.: 17/438,940

(22) PCT Filed: Mar. 10, 2020

(86) PCT No.: PCT/JP2020/010148
§ 371 (c)(1),
(2) Date: Sep. 14, 2021

(87) PCT Pub. No.: WO2020/184532
PCT Pub. Date: Sep. 17, 2020

(65) Prior Publication Data
US 2022/0151134 A1    May 19, 2022

(30) Foreign Application Priority Data
Mar. 14, 2019  (JP) ................. 2019-047447

(51) Int. Cl.
*A01B 69/04* (2006.01)
*B60R 16/023* (2006.01)
*B60R 16/033* (2006.01)
*G05D 1/00* (2024.01)
*H02J 7/00* (2006.01)

(52) U.S. Cl.
CPC ........ *A01B 69/008* (2013.01); *B60R 16/0231* (2013.01); *B60R 16/033* (2013.01); *G05D 1/0278* (2013.01); *H02J 7/0063* (2013.01)

(58) Field of Classification Search
None
See application file for complete search history.

(56) References Cited

U.S. PATENT DOCUMENTS 8,260,541 B2 *  9/2012  Suzuki .................. G01C 21/26
                                                        340/425.5

FOREIGN PATENT DOCUMENTS

| JP | 2000-287380 A | 10/2000 |
| JP | 2017-13695 A  | 1/2017  |
| JP | 2018-161085 A | 10/2018 |

* cited by examiner

Primary Examiner — Todd Melton
(74) Attorney, Agent, or Firm — Chris Mizumoto

(57) ABSTRACT

The present invention is configured to comprise a position-measuring unit that uses a satellite positioning system to acquire position information regarding a work vehicle, wherein: a current-supplying pathway includes a first current-supplying pathway capable of supplying current to an electrical component, such as the position-measuring unit, from a battery via a first switch, and a second current-supplying pathway capable of supplying current to the position-measuring unit at least from the battery via a second switch; when the first switch is in an ON state, either the first current-supplying pathway or the second current-supplying pathway supplies current to the position-measuring unit from the battery; and when the first switch is in an OFF state, the second current-supplying pathway supplies current to the position-measuring unit from the battery via the second switch in an ON state.

5 Claims, 8 Drawing Sheets

AUTOMATIC TRAVEL SYSTEM

CROSS-REFERENCE

This application is a US National Stage Application under 35 U.S.C. § 371 of International Application No. PCT/JP2020/010148 filed Mar. 10, 2020, which claims foreign priority of JP2019-047447 filed Mar. 14, 2019, the disclosures of which are hereby incorporated by reference in their entirety.

TECHNICAL FIELD

The present invention relates to an automatic travel system for causing a work vehicle to automatically travel.

BACKGROUND ART

The abovementioned automatic travel system includes a position-measuring unit that acquires position information of the work vehicle with the use of a satellite positioning system or the like, and causes the work vehicle automatically travel along a target travel route generated in advance, on the basis of the position information of the work vehicle acquired by the position-measuring unit (see, for example, Patent Literature 1).

When the automatic travel of the work vehicle is started, an adjustment work such as initializing various devices such as an inertial measurement unit included in the position-measuring unit and adjusting the reception status of radio waves from a positioning satellite is performed. Therefore, when work is performed by automatic travel, the adjustment work is performed, and then the work vehicle is caused to automatically travel along the target travel route on the basis of the position information of the work vehicle acquired by the position-measuring unit.

CITATION LIST

Patent Literature

Patent Literature 1: Japanese Unexamined Patent Application Publication No. 2018-127208

DISCLOSURE OF INVENTION

Problems to be Solved by the Invention

The position-measuring unit is powered by a battery mounted on the work vehicle. Conventionally, the power supply to the position-measuring unit is switched in accordance with the state of a key switch of the work vehicle. When the key switch is turned to an ON state, power is supplied from the battery to the position-measuring unit, and when the key switch is turned to an OFF state, the power supply from the battery to the position-measuring unit is cut off.

When the key switch is switched from the ON state to the OFF state due to, for example, a temporary break or the like during work in automatic travel, the power supply from the battery to the position-measuring unit is cut off. Therefore, in order to resume the work, an adjustment work such as initializing various devices such as an inertial measurement unit included in the position-measuring unit and adjusting the reception status of radio waves from a positioning satellite must be performed again, which takes time to resume the work, and also takes effort.

In view of this situation, the main issue of the present invention is to provide an automatic travel system capable of smoothly resuming work and improving work efficiency even when work is interrupted during the work.

Means for Solving the Problems

A first feature configuration of the present invention is that a battery for power supply, a position-measuring unit to acquire position information of a work vehicle with a use of a satellite positioning system, and a current-supplying pathway to supply current from the battery to the position-measuring unit are included, that the current-supplying pathway includes a first current-supplying pathway capable of supplying current from the battery to electrical components including the position-measuring unit via a first switch and a second current-supplying pathway capable of supplying current at least from the battery to the position-measuring unit via a second switch different from the first switch, that when the first switch is in an ON state, the current is supplied from the battery to the position-measuring unit in both the first current-supplying pathway and the second current-supplying pathway, and that when the first switch is in an OFF state, the current is supplied from the battery to the position-measuring unit by the second current-supplying pathway via the second switch in an ON state.

According to this configuration, when the work vehicle is caused to automatically travel to perform work, by switching the first switch to the ON state, since the current is supplied form the battery to the position-measuring unit in both the first current-supplying pathway and the second current-supplying pathway, the position-measuring unit can appropriately acquire the position information of the work vehicle. Therefore, the work vehicle can be caused to automatically travel to perform the work appropriately.

For example, when the work is interrupted due to a temporary break or the like, even if the first switch is switched to the OFF state, the current can be supplied from the battery to the position-measuring unit by the second current-supplying pathway via the second switch in an ON state. As a result, the position-measuring unit can maintain a state where the position information of the work vehicle can be acquired. Thus, when the work is resumed, the work can be resumed smoothly without performing the adjustment work, and the work efficiency can be improved. Moreover, since the second switch is always in the ON state, it is possible to prevent the second switch from being worn or deteriorated without repeatedly being switched between the ON state and the OFF state, which is good in terms of durability.

A second feature configuration of the present invention is that the second switch is turned to an OFF state after a predetermined time has elapsed since the first switch was turned to the OFF state, and the current supplying from the battery to the position-measuring unit by the second current-supplying pathway is stopped.

Even when the first switch is in the OFF state, the current can be supplied from the battery to the position-measuring unit by the second current-supplying pathway via the second switch in the ON state. However, for example, even when the work is completed, if the current supplying from the battery to the position-measuring unit by the second current-supplying pathway is continued as it is, the power of the battery is wasted. Accordingly, according to this configuration, the second switch is turned to the OFF state after a predetermined time has elapsed after the first switch was turned to the OFF state, and thus the current supplying from the battery to the position-measuring unit by the second current-supplying pathway is stopped, and it is possible to prevent the battery from running out without wasting the power of the battery.

A third feature configuration of the present invention is that a timer unit to measure the predetermined time after the first switch was turned to the OFF state and turn the second switch to the OFF state after the predetermined time has elapsed is included, that when the first switch is the ON state, the current is supplied from the battery to the timer unit in both the first current-supplying pathway and the second current-supplying pathway, and that when the first switch is in the OFF state, the current is supplied from the battery to the timer unit by the second current-supplying pathway via the second switch in the ON state.

According to this configuration, by including the timer unit, it is possible to accurately grasp whether a predetermined time has elapsed since the first switch was turned to the OFF state and appropriately switch the second switch to the OFF state after a predetermined time has elapsed since the first switch was turned to the OFF state. Moreover, even if the first switch is in the OFF state, since the current is supplied from the battery to the timer unit by the second current-supplying pathway, the operation by the timer unit can be performed appropriately even when the first switch is in the OFF state.

A fourth feature configuration of the present invention is that the second switch is turned to an OFF state on a basis of an operation on a predetermined operation tool, and the current supplying from the battery to the position-measuring unit by the second current-supplying pathway is stopped.

According to this configuration, when the current supplying to the position-measuring unit is to be stopped as soon as possible, such as when the work is completed or when a user leaves the work region to work on, the user or the like operates the predetermined operation tool, and the second switch can be thereby turned to the OFF state, and the current supplying from the battery to the position-measuring unit by the second current-supplying pathway can be stopped. As a result, it is possible to prevent unnecessary current supplying from the battery to the position-measuring unit while improving usability for the user and the like.

A fifth feature configuration of the present invention is that a correction information communication device to communicate correction information for acquiring position information of the work vehicle is included, that when the first switch is in the ON state, the current is supplied from the battery to the correction information communication device in both the first current-supplying pathway and the second current-supplying pathway, and that when the first switch is in the OFF state, the current is supplied from the battery to the correction information communication device by the second current-supplying pathway via the second switch in the ON state.

According to this configuration, by including the correction information communication device, the position-measuring unit can acquire the position information of the work vehicle in the state of taking into consideration the correction information, and can acquire the position information of the work vehicle with high accuracy. Moreover, even when the first switch is in the OFF state, since the current is supplied from the battery to the correction information communication device by the second current-supplying pathway via the second switch in the ON state, it is possible to maintain a state where high-precision position information of the work vehicle can be acquired. Therefore, even when work is interrupted in the middle of the work, the position information of the work vehicle can be acquired with high accuracy from the beginning when the work is resumed, and the automatic travel of the work vehicle can be appropriately performed.

DESCRIPTION OF EMBODIMENTS

Embodiments of an automatic travel system according to the present invention will be described with reference to the drawings.

First Embodiment

Figure 1:
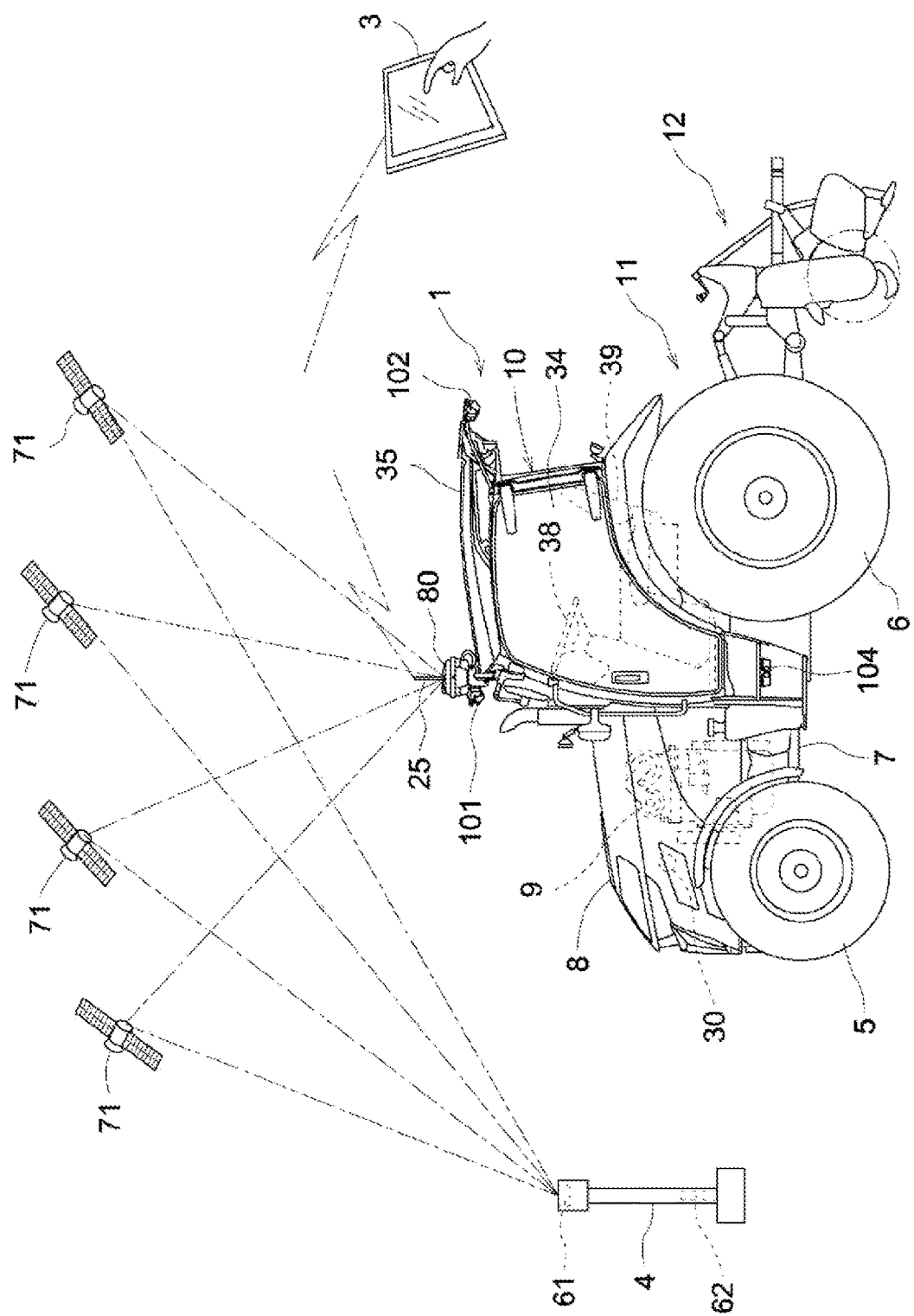
FIG. 1 is a diagram illustrating a simplified configuration of an automatic travel system.

As illustrated in FIG. 1, the automatic travel system is applied to a tractor 1 as a work vehicle, however, may be applied to a riding-type work vehicle such as a riding-type rice transplanter, a combine, a riding-type grass mower, a wheel loader, and a snowplow, and an unmanned work vehicle such as an unmanned grass mower, other than a tractor.

Figure 2:
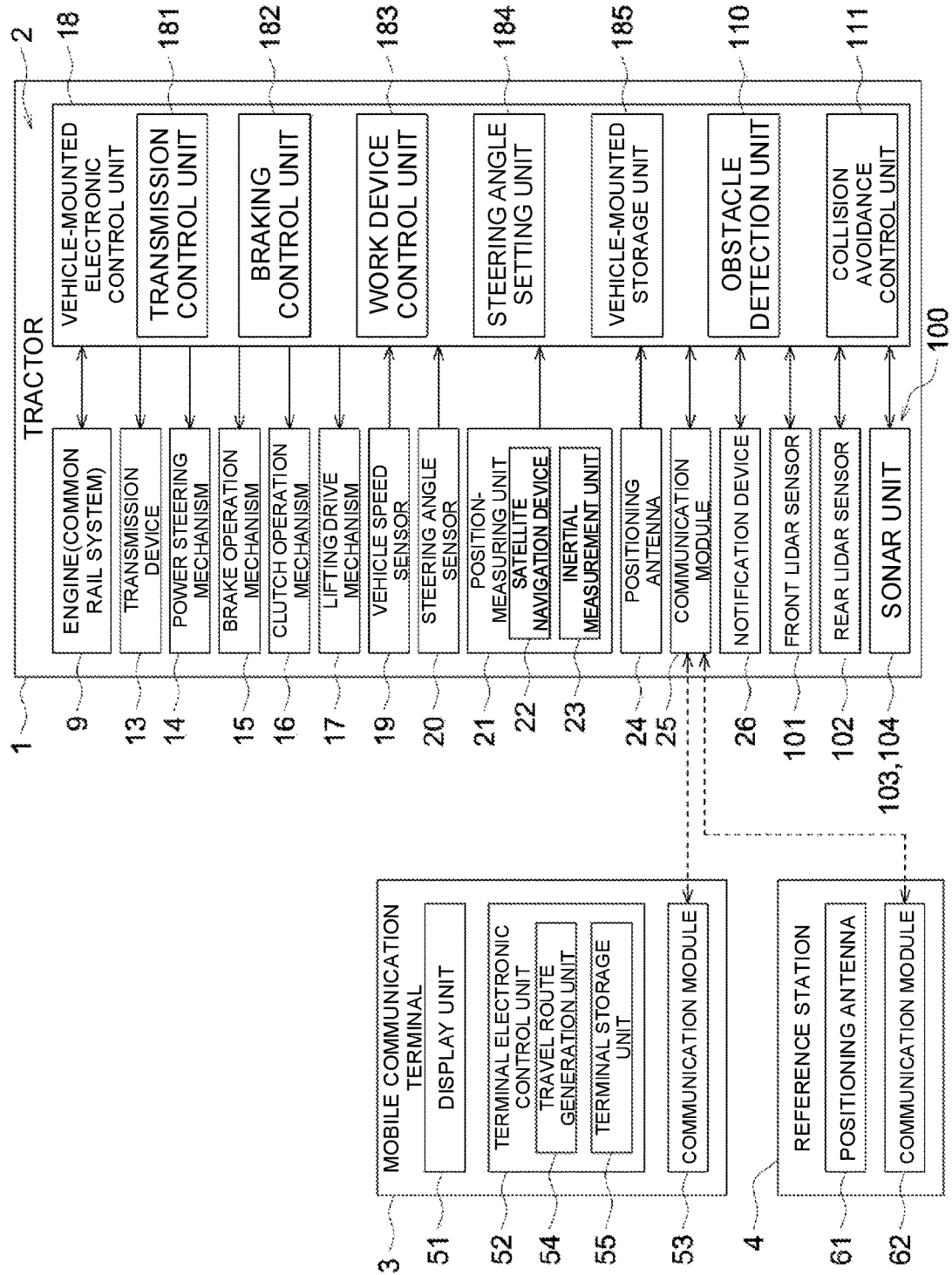
FIG. 2 is a block diagram illustrating a simplified configuration of the automatic travel system.

As illustrated in FIGS. 1 and 2, the automatic travel system includes an automatic travel unit 2 mounted on the tractor 1 and a mobile communication terminal 3 set to communicate with the automatic travel unit 2. For the mobile communication terminal 3, a tablet-type personal computer or a smartphone including a touch-operable touch panel-type display unit 51 (for example, a liquid crystal panel) may be employed.

The tractor 1 includes right and left front wheels 5 functioning as drivable steering wheels, and a traveling machine body 7 including drivable right and left rear wheels 6. A bonnet 8 is disposed forward of the traveling machine body 7, and an electronically controlled diesel engine (hereinafter, referred to as "engine") 9 equipped with a common rail system is included in the bonnet 8. A cabin 10 forming a riding-type driving unit is included rearward of the bonnet 8 of the traveling machine body 7.

A rear part of the traveling machine body 7 may be coupled, via a three-point link mechanism 11, with a rotary tilling device, which is an example of a work device 12, in a manner to allow lifting and rolling. As an alternative to the rotary tilling device, various types of work devices 12 such as a mower, a plow, a seeding device, and a spraying device may be coupled to the rear part of the tractor 1.

As illustrated in FIG. 2, the tractor 1 includes an electronically controlled transmission device 13 that transmits power from an engine 9, a fully hydraulic power steering mechanism 14 that steers the right and left front wheels 5, right and left side brakes (not illustrated) that brakes the right and left rear wheels 6, an electronically controlled brake operation mechanism 15 that enables hydraulic operation of the right and left side brakes, a work clutch (not illustrated) that connects and disconnects transmission to the work device 12 such as a rotary tilling device, an electronically controlled clutch operation mechanism 16 that enables hydraulic operation of the work clutch, an electro-hydraulically controlled lifting drive mechanism 17 that drives the work device 12 such as the rotary tilling device to lift and lower the work device 12, a vehicle-mounted electronic control unit 18 including various types of control programs and the like relating to the automatic travel of the tractor 1 and the like, a vehicle speed sensor 19 that senses a vehicle speed of the tractor 1, a steering angle sensor 20 that senses a steering angle of the front wheels 5, a position-measuring unit 21 that measures a current position and a current azimuth of the tractor 1, and the like.

An electronically controlled gasoline engine including an electronic governor may be employed for the engine 9. A hydromechanical transmission (HMT), a hydrostatic transmission (HST), a belt-type continuously variable transmission, or the like may be employed for the transmission device 13. An electric power steering mechanism 14 including an electric motor, or the like may be employed for the power steering mechanism 14.

As illustrated in FIG. 1, the inside of the cabin 10 includes a steering wheel 38 that enables manually steering of the right and left front wheels 5 via the power steering mechanism 14 (see FIG. 2), a driver's seat 39 for a rider, a touch panel-type display unit, and various types of operation tools.

As illustrated in FIG. 2, the vehicle-mounted electronic control unit 18 includes a transmission control unit 181 configured to control an actuation of the transmission device 13, a braking control unit 182 configured to control actuations of the right and left side brakes, a work device control unit 183 configured to control an actuation of the work device 12 such as the rotary tilling device, a steering angle setting unit 184 configured to set a target steering angle of the right and left front wheels 5 to output the target steering angle to the power steering mechanism 14 during automatic travel, and a non-volatile vehicle-mounted storage unit 185 configured to store a previously generated target travel route P (for example, see FIG. 3) for automatic travel and the like.

As illustrated in FIG. 2, the position-measuring unit 21 includes a satellite navigation device 22 configured to measure a current position and a current azimuth of the tractor 1 by utilizing Global Positioning System (GPS) which is an example of a satellite positioning system (Navigation Satellite System: NSS), an inertial measurement unit (IMU) 23 including a three-axis gyroscope, a three-directional acceleration sensor, and the like, and being configured to measure the attitude, the azimuth, and the like of the tractor 1. A positioning method utilizing the GPS includes Differential GPS (DGPS, a relative positioning method) and Real Time Kinematic GPS (RTK-GPS, an interference positioning method). In the present embodiment, RTK-GPS suitable for measuring a position of a moving body is adopted. Therefore, as illustrated in FIGS. 1 and 2, a reference station 4 that enables measurement of a position by RTK-GPS is installed at a known position in the vicinity of a farm field.

As illustrated in FIG. 2, the tractor 1 and the reference station 4 respectively include positioning antennas 24 and 61 that receive a radio wave transmitted from a positioning satellite 71 (see FIG. 1) and communication modules 25 and 62 that enable radio communication of various types of information including positioning information (correction information) between the tractor 1 and the reference station 4. This enables the satellite navigation device 22 to highly accurately measure a current position and a current azimuth of the tractor 1, on the basis of positioning information obtained by the positioning antenna 24 on a tractor side receiving a radio wave from the positioning satellite 71 and positioning information (correction information for measuring the current position of the tractor 1) obtained by the positioning antenna 61 on a base station side receiving a radio wave from the positioning satellite 71. In addition, the position-measuring unit 21 includes the satellite navigation device 22 and the inertial measurement unit 23, and thus can highly accurately measure the current position, current azimuth, and attitude angle (a yaw angle, a roll angle, and a pitch angle) of the tractor 1.

The positioning antenna 24, the communication module 25, and the inertial measurement unit 23 included in the tractor 1 are housed in an antenna unit 80, as illustrated in FIG. 1. The antenna unit 80 is disposed at an upper position on the front side of the cabin 10.

As illustrated in FIG. 2, the mobile communication terminal 3 includes a terminal electronic control unit 52 including various types of control programs and the like for controlling the actuation of the display unit 51 and the like, a communication module 53 that enables radio communication of various types of information including positioning information with the communication module 25 on the tractor side, and the like. The terminal electronic control unit 52 includes a travel route generation unit 54 that generates a target travel route P (see, for example, FIG. 3) for causing the tractor 1 to automatically travel, and a non-volatile terminal storage unit 55 that stores, for example, various types of input information input by a user and the target travel route P generated by the travel route generation unit 54.

Upon the travel route generation unit 54 generating the target travel route P, in accordance with an input guide for setting the target travel route displayed on the display unit 51 of the mobile communication terminal 3, a user, for example, such as a driver and an administrator, inputs vehicle body information such as a model of the work vehicle, a type, a work width, and the like of the work device 12, and the input vehicle body information is stored in the terminal storage unit 55. A travel region S (see FIG. 3) in which the target travel route P is to be generated is defined as a farm field, and the terminal electronic control unit 52 of the mobile communication terminal 3 acquires farm field information including the shape and position of the farm field and stores the information in the terminal storage unit 55.

Figure 3:
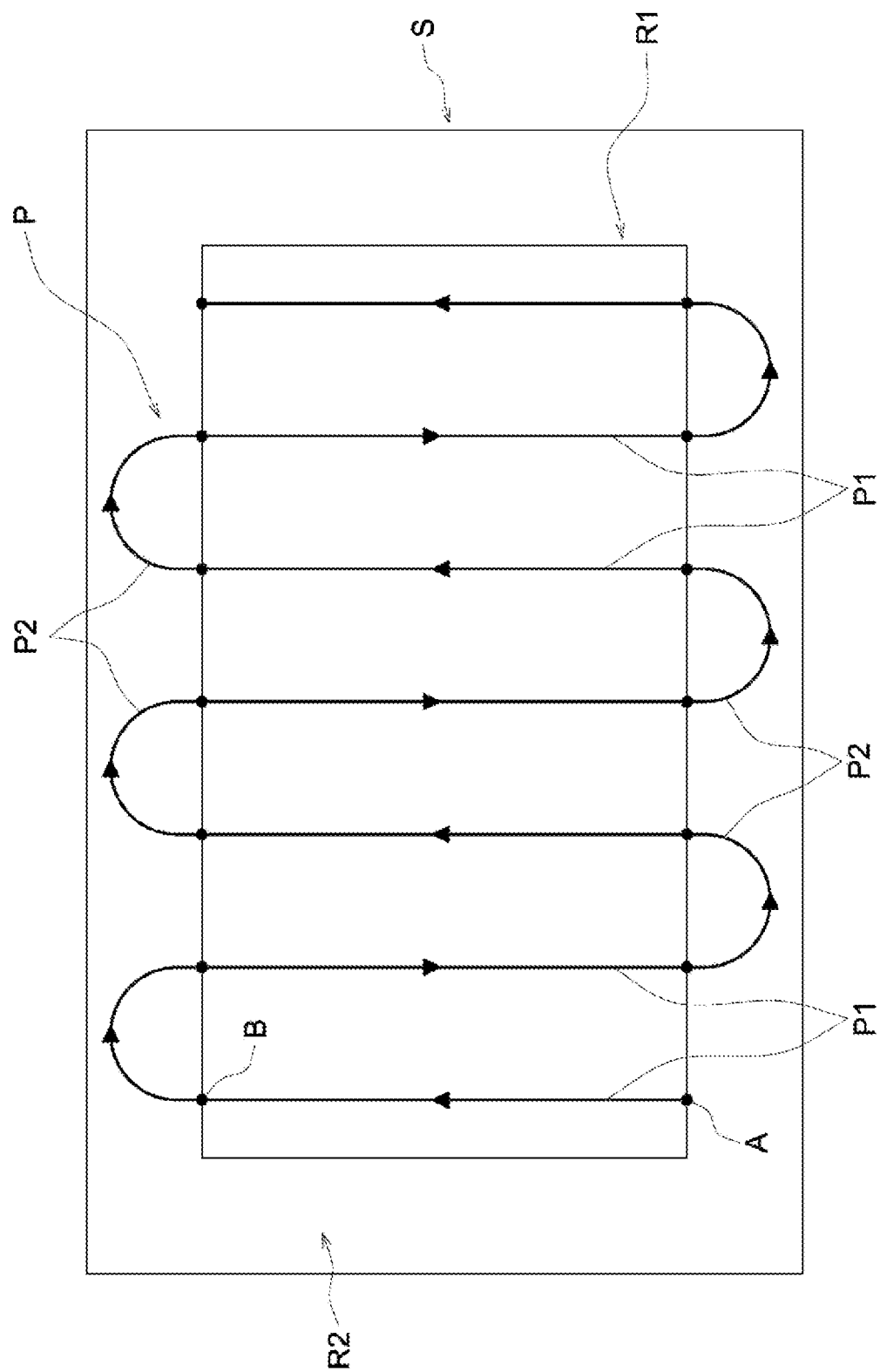
FIG. 3 is a diagram illustrating a work region in a state where a target travel route is generated.

Acquisition of the farm field information will be described. When a user or the like drives the tractor 1 to cause the tractor 1 to actually travel, the terminal electronic control unit 52 can acquire position information for identifying the shape, position, and the like of the farm field from the current position of the tractor 1 and the like acquired by the position-measuring unit 21. The terminal electronic control unit 52 identifies the shape and the position of the farm field from the acquired position information, and acquires the farm field information including the travel region S identified from the identified shape and position of the farm field. FIG. 3 illustrates an example in which the travel region S having a rectangular shape is identified.

If the farm field information including the identified shape, position, and the like of the farm field is stored in the terminal storage unit 55, the travel route generation unit 54 generates the target travel route P with the use of the farm field information and the vehicle body information stored in the terminal storage unit 55.

As illustrated in FIG. 3, the travel route generation unit 54 divides and sets the inside of the travel region S into a central region R1 and an outer peripheral region R2. The central region R1 is set in a central portion of the travel region S, and is a reciprocating work region in which the tractor 1 is caused to automatically travel in a reciprocating direction to perform a predetermined work (for example, a work such as a tillage). The outer peripheral region R2 is set around the central region R1. The travel route generation unit 54 obtains a space and the like for turning and traveling required for causing the tractor 1 to turn and travel at an edge of a dike of the farm field, from a turning radius included in the vehicle body information, a front-rear width and a right-left width of the tractor 1, and the like. The travel route generation unit 54 divides the inside of the travel region S into the central region R1 and the outer peripheral region R2 to secure the obtained space or the like in an outer periphery of the central region R1.

As illustrated in FIG. 3, the travel route generation unit 54 generates the target travel route P with the use of the vehicle body information, the farm field information, and the like. The target travel route P includes, for example, a plurality of linear work routes P1 each having the same straight distance and being arranged in parallel at a fixed interval corresponding to a work width in the central region R1. The plurality of work routes P1 are routes along which the tractor 1 travels linearly to perform a predetermined work. Each of coupling routes P2 is a U-turn route for changing a travel direction of the tractor 1 by 180 degrees, where no predetermined work is performed, and couples a terminal end of each of the work routes P1 and a start end of the next work route P1.

The target travel route P illustrated in FIG. 3 is merely an example, and any target travel route to be set may be appropriately changed. For example, the travel route generation unit 54 may generate only the work route P1 without generating the coupling route P2. In this case, when the user or the like drives and actually runs the tractor 1, as illustrated in FIG. 3, the points A and B which are the start and end points of the work are registered. The travel route generation unit 54 may generate a linear initial straight route connecting a point A and a point B, and generate a plurality of parallel routes parallel to the initial straight route to thereby define the initial straight route and the plurality of parallel routes as the work route P1.

The target travel route P generated by the travel route generation unit 54 may be displayed on the display unit 51, and is stored in the terminal storage unit 55 as route information associated with the vehicle body information, the farm field information, and the like. The route information includes the azimuth angle of the target travel route P, and an engine rotation speed and target travel speed set in accordance with a travel mode and the like of the tractor 1 on the target travel route P.

In this way, when the travel route generation unit 54 generates the target travel route P, the terminal electronic control unit 52 transfers the route information from the mobile communication terminal 3 to the tractor 1, and as a result, the vehicle-mounted electronic control unit 18 of the tractor 1 can acquire the route information. The vehicle-mounted electronic control unit 18 can cause the tractor 1 to automatically travel along the target travel route P, on the basis of the acquired route information, while acquiring the own current position (the current position of the tractor 1) by the position-measuring unit 21. The current position of the tractor 1 acquired by the position-measuring unit 21 is transmitted from the tractor 1 to the mobile communication terminal 3 in real time (for example, in a cycle of a few milliseconds), and thus, the current position of the tractor 1 is grasped by the mobile communication terminal 3.

As for the transfer of the route information, at a stage before the tractor 1 starts the automatic travel, the entire route information may be transferred from the terminal electronic control unit 52 to the vehicle-mounted electronic control unit 18 all at once. In addition, for example, the route information including the target travel route P may be divided into a plurality of route portions each having a small amount of information for each predetermined distance. In this case, at a stage before the tractor 1 starts the automatic travel, only an initial route portion of the route information is transferred from the terminal electronic control unit 52 to the vehicle-mounted electronic control unit 18. After the start of the automatic travel, each time the tractor 1 reaches a route acquisition point set in accordance with the amount of information or the like, the route information having only a subsequent route portion corresponding to the point may be transferred from the terminal electronic control unit 52 to the vehicle-mounted electronic control unit 18.

When the automatic travel of the tractor 1 is started, for example, once the user or the like moves the tractor 1 to a start point and if various types of automatic travel start conditions are fulfilled, the user operates the display unit 51 in the mobile communication terminal 3 to instruct the start of the automatic travel, and thus the mobile communication terminal 3 transmits, to the tractor 1, an instruction to start the automatic travel. As a result, in the tractor 1, receiving the instruction to start the automatic travel, the vehicle-mounted electronic control unit 18 starts the automatic travel control to cause the tractor 1 to automatically travel along the target travel route P while acquiring the own current position (the current position of the tractor 1) by the position-measuring unit 21. The vehicle-mounted electronic control unit 18 is configured as an automatic travel control unit configured to perform automatic travel control to cause the tractor 1 to automatically travel along the target travel route P within the travel region S, on the basis of the positioning information of the tractor 1 acquired by the position-measuring unit 21 with the use of the satellite positioning system.

The automatic travel control includes an automatic transmission control for automatically controlling an actuation of the transmission device 13, an automatic braking control for automatically controlling an actuation of the brake operation mechanism 15, an automatic steering control for automatically steering the right and left front wheels 5, and an automatic work control for automatically controlling an actuation of the work device 12 such as the rotary tilling device.

In the automatic transmission control, the transmission control unit 181 automatically controls an actuation of the transmission device 13 in such a manner that the target travel speed set in accordance with a travel mode and the like of the tractor 1 on the target travel route P is obtained as the vehicle speed of the tractor 1, on the basis of the route information of the target travel route P including the target travel speed, an output of the position-measuring unit 21, and an output of the vehicle speed sensor 19.

In the automatic braking control, on the basis of the target travel route P and the output of the position-measuring unit 21, the braking control unit 182 automatically controls an actuation of the brake operation mechanism 15 in such a manner that in a braking area included in the route information of the target travel route P, the right and left side brakes properly brake the right and left rear wheels 6.

In the automatic steering control, on the basis of the route information of the target travel route P and the output of the position-measuring unit 21, the steering angle setting unit 184 obtains and sets the target steering angle of the right and left front wheels 5 in such a manner that the tractor 1 automatically travels on the target travel route P, and outputs the set target steering angle to the power steering mechanism 14. The power steering mechanism 14 automatically steers the right and left front wheels 5, on the basis of the target steering angle and the output of the steering angle sensor 20, in such a manner that the target steering angle is obtained as the steering angle of the right and left front wheels 5.

In the automatic work control, the work device control unit 183 automatically controls an actuation of the clutch operation mechanism 16 and the lifting drive mechanism 17, on the basis of the route information of the target travel route P and the output of the position-measuring unit 21, in such a manner that a predetermined work (for example, a tilling work) by the work device 12 is started as the tractor 1 reaches a work start point such as the starting end of the work route P1 (see, for example, FIG. 3), and the predetermined work by the work device 12 is stopped as the tractor 1 reaches a work end point such as the terminal end of the work route P1 (see, for example, FIG. 3).

In this way, in the tractor 1, the automatic travel unit 2 includes the transmission device 13, the power steering mechanism 14, the brake operation mechanism 15, the clutch operation mechanism 16, the lifting drive mechanism 17, the vehicle-mounted electronic control unit 18, the vehicle speed sensor 19, the steering angle sensor 20, the position-measuring unit 21, the communication module 25, and the like.

In this embodiment, it is not only possible to cause the tractor 1 to automatically travel without a user or the like riding in the cabin 10, but also possible to cause the tractor 1 to automatically travel with a user or the like riding in the cabin 10. Therefore, it is not only possible to cause the tractor 1 to automatically travel along the target travel route P without a user or the like riding in the cabin 10 by the automatic travel control of the vehicle-mounted electronic control unit 18, but possible to cause the tractor 1 to automatically travel along the target travel route P, even with a user or the like riding in the cabin 10, by the automatic travel control of the vehicle-mounted electronic control unit 18.

When a user or the like is riding in the cabin 10, it is also possible to switch between an automatic travel state where the tractor 1 is caused to automatically travel by the vehicle-mounted electronic control unit 18, and a manual travel state where the tractor 1 is caused to travel on the basis of a driving operation of the user or the like. Therefore, it is possible to switch from the automatic travel state to the manual travel state while the tractor 1 automatically travels on the target travel route P in the automatic travel state, and on the other hand, it is also possible to switch from the manual travel state to the automatic travel state while the tractor 1 travels in the manual travel state. For switching between the manual travel state and the automatic travel state, for example, a switching operation unit for switching between the automatic travel state and the manual travel state may be provided in the vicinity of the driver's seat 39, and the switching operation unit may be displayed on the display unit 51 of the mobile communication terminal 3. In addition, it is possible to switch from the automatic travel state to the manual travel state when the user operates the steering wheel 38 while the automatic traveling control is performed by the vehicle-mounted electronic control unit 18.

As illustrated in FIGS. 1 and 2, the tractor 1 includes an obstacle detection system 100 for detecting an obstacle around the tractor 1 (traveling machine body 7) to avoid a collision with the obstacle. The obstacle detection system 100 includes a plurality of LIDAR sensors 101 and 102 capable of measuring a distance to a target to be measured in a three-dimensional manner with the use of a laser, sonar units 103 and 104 including a plurality of sonars capable of measuring a distance to a target to be measured with the use of ultrasonic waves, an obstacle detection unit 110, and a collision avoidance control unit 111.

A target to be measured which is measure by the LIDAR sensors 101 and 102 and the sonar units 103 and 104 is an object, a person, or the like. The LIDAR sensors 101 and 102 include a front LIDAR sensor 101 that measures the front side of the tractor 1 as a target to be measured and a rear LIDAR sensor 102 that measures the rear side of the tractor 1 as a target to be measured. The sonar units 103 and 104 include the right sonar unit 103 that measures the right side of the tractor 1 as a target to be measured and the left sonar unit 104 that measures the left side of the tractor 1 as a target to be measured.

The obstacle detection unit 110 is configured to perform an obstacle detection process in which a target to be measured such as an object and a person within a predetermined distance is detected as an obstacle, on the basis of measurement information of the LIDAR sensors 101 and 102 and the sonar units 103 and 104. The collision avoidance control unit 111 is configured to perform collision avoidance control for decelerating the tractor 1 or stopping the tractor 1 from traveling when the obstacle detection unit 110 detects an obstacle. In the collision avoidance control, the collision avoidance control unit 111 not only decelerates the tractor 1 or stops the tractor 1 from traveling, but also activates a notification device 26 such as an alarm buzzer and an alarm lamp to notify that there is an obstacle. In the collision avoidance control, the collision avoidance control unit 111 uses communication modules 25 and 53 to communicate to the mobile communication terminal 3 from the tractor 1 to display the presence of an obstacle on the display unit 51, and thus it is possible to notify that there is the obstacle.

The obstacle detection unit 110 repeatedly performs in real time the obstacle detection process based on the measurement information of the LIDAR sensors 101 and 102 and the sonar units 103 and 104 to appropriately detect an obstacle such as an object and a person. The collision avoidance control unit 111 performs collision avoidance control for avoiding collision with an obstacle detected in real time.

The obstacle detection unit 110 and the collision avoidance control unit 111 are included in the vehicle-mounted electronic control unit 18. The vehicle-mounted electronic control unit 18 is communicably connected to an electronic control unit for the engine, the LIDAR sensors 101 and 102, the sonar units 103 and 104, and the like included in a common rail system, through a controller area network (CAN).

As described above, when the automatic travel of the tractor 1 is started, after moving the tractor 1 to the start point, various devices such as the inertial measurement unit 23 included in the position-measuring unit 21 are initialized, and an adjustment work such as adjusting the reception status of radio waves from the positioning satellite 71 is performed. For example, if the work is interrupted during the work due to a temporary break or the like, it is necessary to perform the adjustment work again, and it takes time to resume the work and it takes time and effort. Thus, it is not possible to resume the work smoothly.

Accordingly, in this embodiment, by devising the current-supplying circuit from the battery 27 to the position-measuring unit 21, even if the work is interrupted, the power supply to the position-measuring unit 21 and the like is continued, and when the work is resumed, there is no need to perform the adjustment work, and the work can be resumed smoothly.

Figure 5:
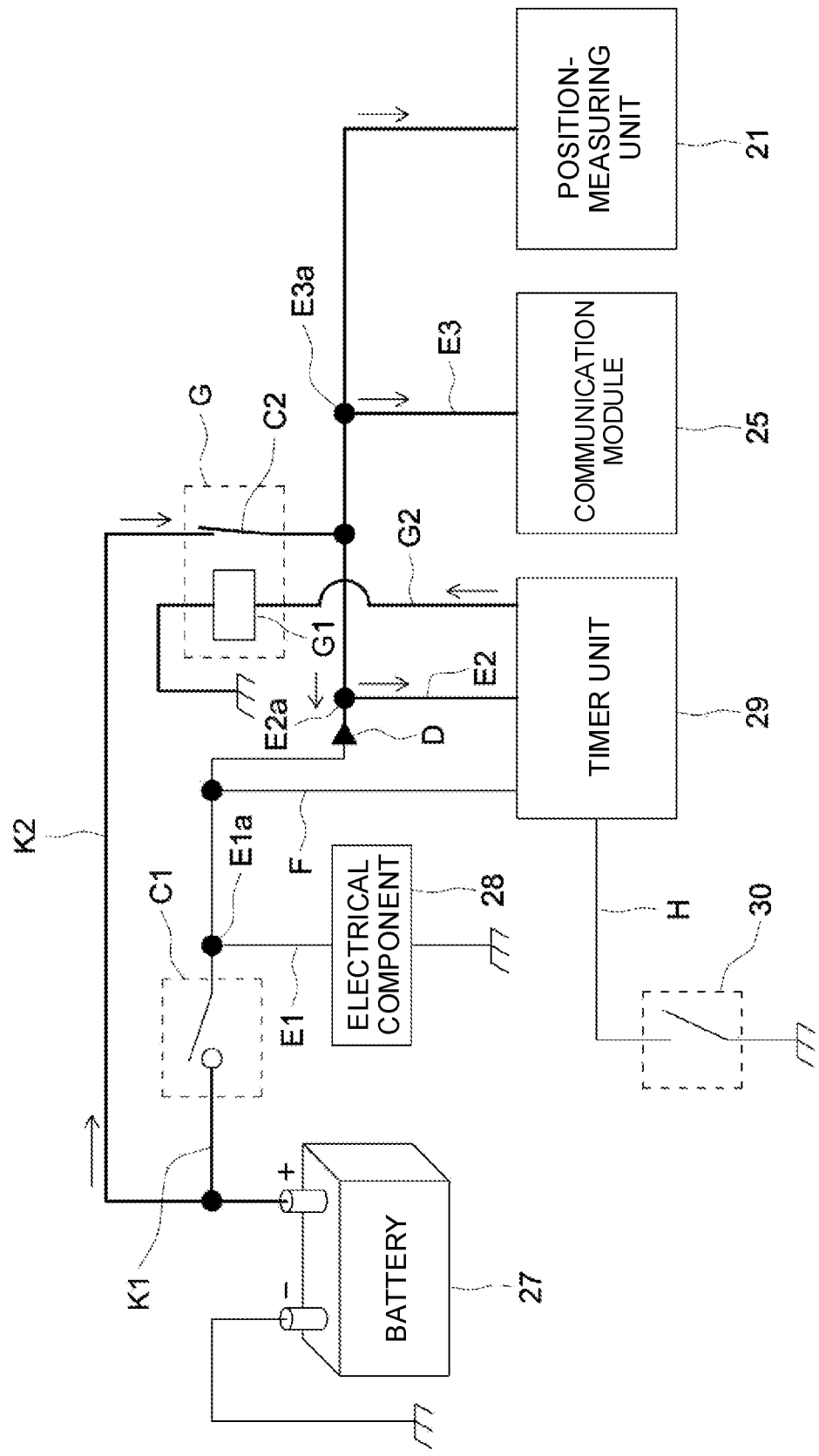
FIG. 5 is a diagram illustrating a current-supplying circuit from the battery to the position-measuring unit.
Figure 6:
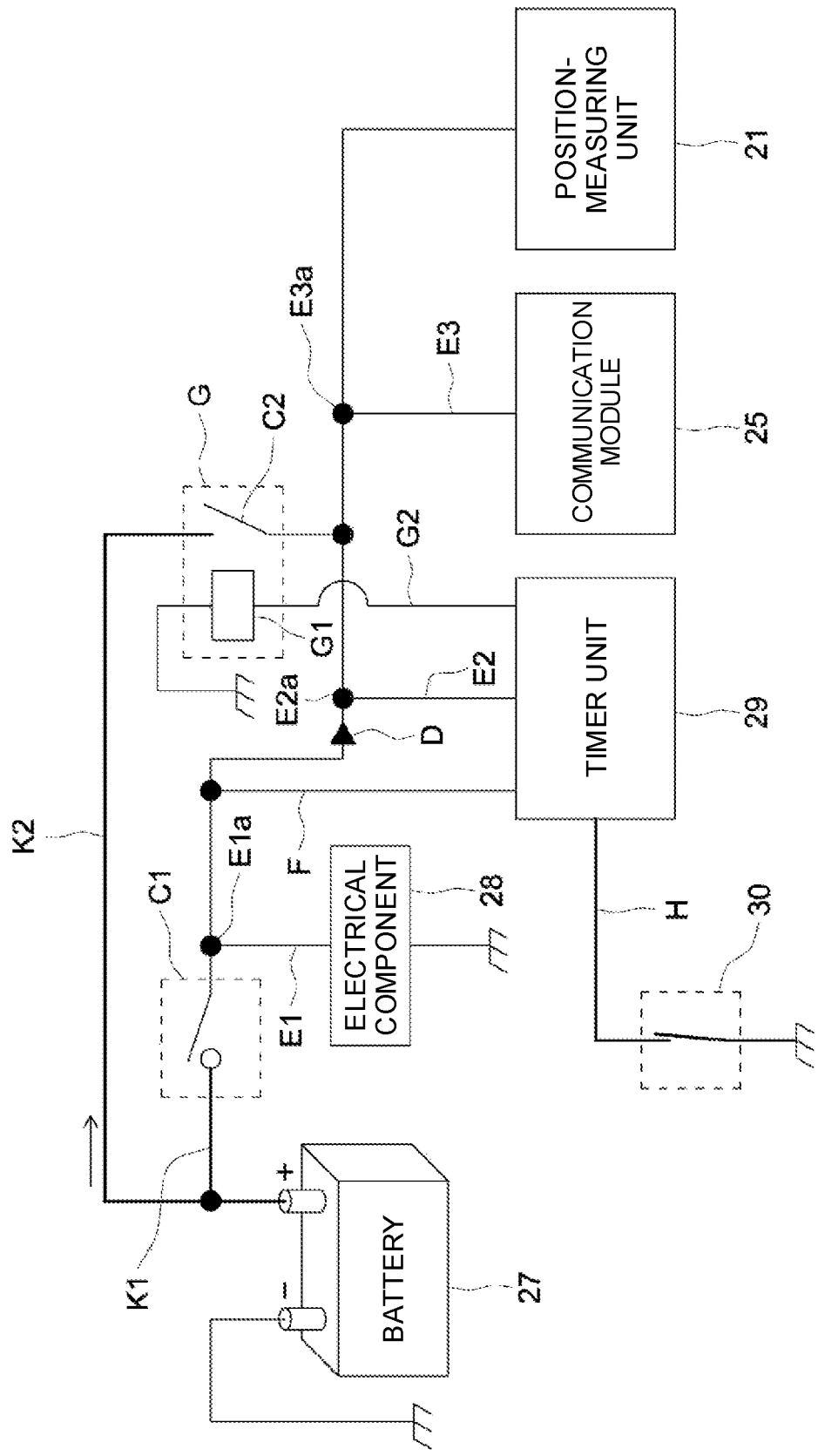
FIG. 6 is a diagram illustrating a current-supplying circuit from the battery to the position-measuring unit.

Hereinafter, the current-supplying circuit from the battery 27 to the position-measuring unit 21 will be described with reference to FIGS. 4 to 6. Since FIGS. 4 to 6 illustrate the same current-supplying circuit except that the current-supplied portion (thick line portion) is different, the description will be made with reference to FIG. 4.

Figure 4:
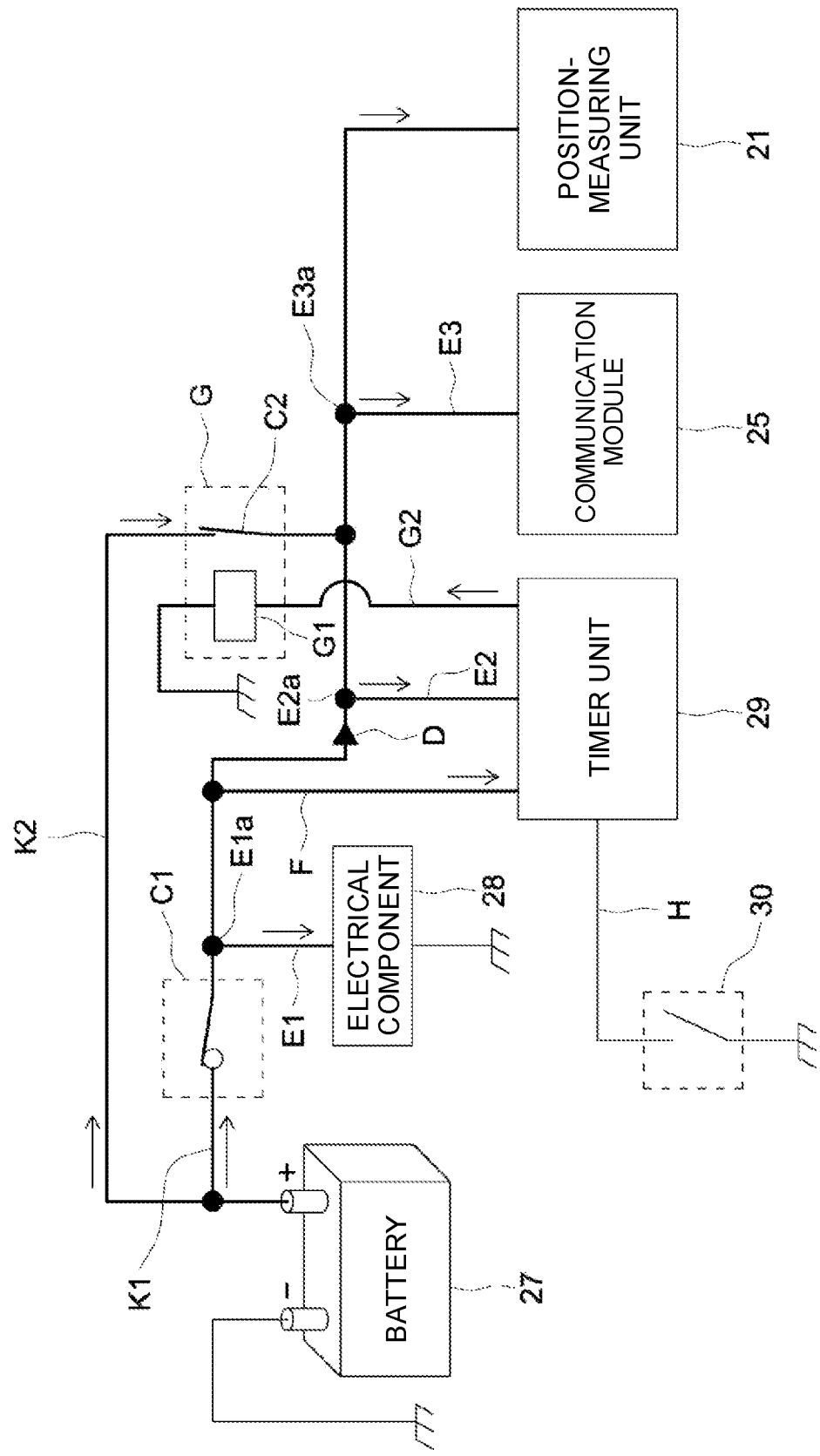
FIG. 4 is a diagram illustrating a current-supplying circuit from a battery to a position-measuring unit.

FIG. 4 illustrates a current-supplying pathway from the battery 27 housed in the bonnet 8 to various electrical components. As electrical components for supplying electric power from the battery 27, a position-measuring unit 21, a timer unit 29, a communication module 25, and other electrical components 28 are included. As a current-supplying pathway from the battery 27 to the position-measuring unit 21, a first current-supplying pathway K1 capable of supplying current to the position-measuring unit 21 and each electrical component 28 from the battery 27 via a first switch C1 and a second current-supplying pathway K2 capable of supplying current to the position-measuring unit 21 from the battery 27 via a second switch C2 different from the first switch C1 are provided.

The first current-supplying pathway K1 is a current-supplying pathway that connects the battery 27 and the position-measuring unit 21. In the first current-supplying pathway K1, the first switch C1 is arranged on the most upstream side in the current-supplying direction. The first switch C1 includes a key switch for starting power supply to each electrical component 28 and starting the engine 9, and this key switch is disposed in the vicinity of the steering wheel 38 of the cabin 10. The first switch C1 is switched between an ON state and an OFF state in accordance with an operation by the user or the like, is turned to the ON state by an ON operation of the key switch, and is turned to the OFF state by an OFF operation of the key switch.

As illustrated in FIG. 4, in the first current-supplying pathway K1, first to third branch pathways E1 to E3 are branched and connected to the downstream side of the first switch C1, and in addition to the position-measuring unit 21, each electrical component 28, the timer unit 29, and the communication module 25 can be supplied current. The first branch pathway E1 is branched from the most upstream side in the current-supplying direction, and is a pathway connecting the battery 27 and each electrical component 28 (electrical components other than the position-measuring unit 21, timer unit 29, and communication module 25). The second branch pathway E2 is branched from the downstream side in the current-supplying direction with respect to a first branch connection point E1a of the first branch pathway E1 and is a pathway connecting the battery 27 and the timer unit 29. The third branch pathway E3 is branched from the downstream side in the current-supplying direction with respect to a second branch connection point E2a of the second branch pathway E2 and is a pathway connecting the battery 27 and the communication module 25.

The second branch pathway E2 connected to the timer unit 29 and the third branch pathway E3 connected to the communication module 25 can be arranged in such a manner that the upstream side and the downstream side are opposite to each other in the current-supplying direction. How the second and third branch pathways E2 and E3 should be arranged in the current-supplying direction can be appropriately changed.

In the first current-supplying pathway K1, between the first branch connection point E1a and the second branch connection point E2a, a diode D is arranged in which the current-supplying direction is one direction from the first branch connection point E1a side to the second branch connection point E2a side. As a result, in the first current-supplying pathway K1, the current supplying from the second branch connection point E2a side to the first branch connection point E1a side is prevented.

In the first current-supplying pathway K1, between the first branch connection point E1a and the diode D, an ON signal input pathway F for inputting an ON signal indicating that the first switch C1 (key switch) is in the ON state to the timer unit 29 is included. As a result, by inputting the ON signal via the ON signal input pathway F, the timer unit 29 knows whether the first switch C1 is in the ON state or the OFF state, and the timing when the first switch C1 is switched from the ON state to the OFF state.

The second current-supplying pathway K2 is a pathway that branches from an intermediate portion of the first current-supplying pathway K1 and merges with the intermediate portion of the first current-supplying pathway K1. The second current-supplying pathway K2 serves as a part of the first current-supplying pathway K1, and is included in parallel with the first current-supplying pathway K1. The second switch C2 is arranged in the second current-supplying pathway K2, and the first switch C1 and the second switch C2 are included in parallel. The second switch C2 is configured as a normally closed switch that is always in the ON state, and is provided with a power retaining relay circuit G that retains the ON state. The power retaining relay circuit G is provided with a relay control output pathway G2 that outputs a relay control output from the timer unit 29 to a coil G1. The power retaining relay circuit G retains the second switch C2 in the ON state while the relay control output is output from the timer unit 29 to the coil G1 via the relay control output pathway G2, and switches the second switch C2 to the OFF state when the relay control output from the timer unit 29 to the coil G1 is stopped.

The second current-supplying pathway K2 is branched from the upstream side of the first switch C1 in the first current-supplying pathway K1 and merges between the second branch connection point E2a and a third branch connection point E3a in the first current-supplying pathway K1. As a result, the second current-supplying pathway K2 can supply current to the position-measuring unit 21, the timer unit 29, and the communication module 25 from the battery 27 via the second switch C2. In the first current-supplying pathway K1, since the diode D that regulates the current-supplying direction in one direction is arranged between the first branch connection point E1a and the second branch connection point E2a, the current supplying to each electrical component 28 is prevented by the second current-supplying pathway K2.

Hereinafter, when the tractor 1 automatically travels to perform work, the switching between the first switch C1 and the second switch C2 and the current-supplying state in the state where the first switch C1 and the second switch C2 are switched will be described.

When the tractor 1 automatically travels, the first switch (key switch) C1 is switched to the ON state. When the first switch C1 is in the ON state, as illustrated in FIG. 4, the current is supplied from the battery 27 to the position-measuring unit 21 in both the first current-supplying pathway K1 and the second current-supplying pathway K2. That is, when the first switch C1 is in the ON state, the current can be supplied from the battery 27 to the position-measuring unit 21 via either the current-supplying pathway of the first current-supplying pathway K1 or the second current-supplying pathway K2. In doing so, for example, by adjusting the potential difference or the like, the first current-supplying pathway K1 can be given priority over the second current-supplying pathway K2 to supply current.

When the first switch C1 is in the ON state, as illustrated in FIG. 4, the current can be supplied to each of the first to third branch pathways E1 to E3 in the first current-supplying pathway K1. As a result, the current is supplied from the battery 27 to the position-measuring unit 21 via the first current-supplying pathway K1 and the first to third branch pathways E1 to E3, and the current is also supplied from the battery 27 to each electrical component 28, the timer unit 29, and the communication module 25. In addition, the current is supplied from the battery 27 to the position-measuring unit 21 via the second current-supplying pathway K2 and the second and third branch pathways E2 and E3, and the current is also supplied from the battery 27 to the timer unit 29, and the communication module 25.

In this manner, when the tractor 1 automatically travels, by turning the first switch C1 to the ON state, the current can be supplied from the battery 27 to the position-measuring unit 21, each electrical component 28, the timer unit 29, and the communication module 25, via the first current-supplying pathway K1 and the second current-supplying pathway K2. Therefore, each electrical component 28 becomes ready for use, and in the position-measuring unit 21, in addition to the positioning information acquired by the positioning antenna 24 on the tractor side receiving the radio waves from the positioning satellite 71, the communication module 25 (corresponding to the correction information communication device) receives the correction information acquired by the positioning antenna 61 on the base station side receiving the radio wave from the positioning satellite 71. Thus, the current position and current azimuth of the tractor 1 can be measured with high accuracy from the positioning information and the correction information.

For example, when the automatic travel of the tractor 1 is interrupted due to a temporary break or the like, the first switch C1 is switched from the ON state to the OFF state. When the first switch C1 is in the OFF state, as illustrated in FIG. 5, the current is supplied from the battery 27 to the position-measuring unit 21 by the second current-supplying pathway K2 via the second switch C2 in the ON state. In doing so, since it is possible to supply current to each of the second branch pathway E2 and the third branch pathway E3, the current is supplied from the battery 27 to the position-measuring unit 21 via the second current-supplying pathway K2 and the second and third branch pathways E2 and E3, and the current is also supplied from the battery 27 to the timer unit 29, and the communication module 25.

As illustrated in FIG. 5, even if the first switch C1 is in the OFF state, the second switch C2 which is a normally closed switch is in the ON state. Thus, the current is supplied from the battery 27 to the position-measuring unit 21, the timer unit 29, and the communication module 25 via the second current-supplying pathway K2. As a result, the power supply to the position-measuring unit 21 and the communication module 25 is maintained, and thus the state where the adjustment work has already been performed is maintained.

That is, the position-measuring unit 21 can maintain a state where the current position and the current azimuth of the tractor 1 are measured with high accuracy from the positioning information and the correction information.

Therefore, even if the work is interrupted during the work and the first switch C1 is switched to the OFF state, as illustrated in FIG. 5, the current is supplied from the battery 27 to the position-measuring unit 21, the timer unit 29, and the communication module 25 via the second current-supplying pathway K2. Thus, the position-measuring unit 21 can maintain a state where the current position and the current azimuth of the tractor 1 are measured with high accuracy from the positioning information and the correction information. As a result, the automatic travel of the tractor 1 can be restarted without performing the adjustment work again, and the work can be resumed smoothly. When the automatic travel of the tractor 1 is restarted, the first switch C1 is switched from the OFF state to the ON state.

The first switch C1 is switched to the OFF state not only when the work is temporarily interrupted during the work but also when the work is completed. In this case, if the state of supplying current to the position-measuring unit 21, the timer unit 29, and the communication module 25 from the battery 27 via the second current-supplying pathway K2 is continued, the power of the battery 27 is wasted.

Accordingly, in this embodiment, the timer unit 29 measures the time after the first switch is turned to the OFF state, and when a predetermined time (for example, 2 hours) has elapsed since the start of the measurement, as illustrated in FIG. 6, the second switch C2 is turned to OFF state to stop the current supplying from the battery 27 to the position-measuring unit 21, the timer unit 29, and the communication module 25 by the second current-supplying pathway K2. The predetermined time can be set to, for example, a fixed time of two hours, or the predetermined time can be changed and set.

As illustrated in FIG. 4, the timer unit 29 receives an ON signal input via the ON signal input pathway F when the first switch C1 is in the ON state. Thus, as illustrated in FIG. 5, the timer unit 29 can recognize the timing when the input of the ON signal is lost as the timing when the first switch C1 is changed from the ON state to the OFF state. As illustrated in FIGS. 4 and 5, the timer unit 29 outputs the relay control output to the coil G1 via the relay control output pathway G2 by receiving the power supply. When the measurement time after the first switch is turned to the OFF state reaches a predetermined time (for example, two hours), as illustrated in FIG. 6, the timer unit 29 stops the relay control output to the coil G1 and thereby switches the second switch C2 to the OFF state.

The timer unit 29 resets the measured time to zero when the first switch C1 is switched from the OFF state to the ON state. Therefore, for example, even when the first switch C1 is switched from the OFF state to the ON state while the timer unit 29 is measuring the time after the first switch is turned to the OFF state, the timer unit 29 resets the measured time to zero.

As illustrated in FIG. 6, when both the first switch C1 and the second switch C2 are in the OFF state, the current supplying from the battery 27 to the position-measuring unit 21, each electrical component 28, the timer unit 29, and the communication module 25 is stopped. As a result, when the work is completed, the current supplying to the position-measuring unit 21 and the like is stopped after a predetermined time has elapsed since the first switch C1 was switched to the OFF state, and the power of the battery 27 is not wasted and is the battery is prevented from running out.

When the work is completed, it may be desired to stop the current supplying to the position-measuring unit 21 and the like without waiting for a predetermined time to elapse after switching the first switch C1 to the OFF state. Accordingly, in this embodiment, as illustrated in FIG. 4, a power cutoff switch 30 for switching the second switch C2 to the OFF state even if a predetermined time has not elapsed since the first switch C1 was switched to the OFF state (corresponding to a predetermined operation tool) is included.

The power cutoff switch 30 is configured as a normally open switch that is always in the OFF state, and is switched to the ON state by an operation of the user or the like. The power cutoff switch 30 is disposed in the bonnet 8 as indicated by the dotted line in FIG. 1, and is included in a portion not exposed to the outside. This prevents the power cutoff switch 30 from being accidentally operated, and prevents the current supplying to the position-measuring unit 21 and the like from being stopped due to an erroneous operation or the like.

As illustrated in FIG. 4, a cutoff switch ON signal indicating that the power cutoff switch 30 is in the ON state can be input to the timer unit 29 via a cutoff switch ON signal input pathway H. As illustrated in FIG. 6, when the power cutoff switch 30 is switched to the ON state, the cutoff switch ON signal is input to the timer unit 29 via the cutoff switch ON signal input pathway H. As a result, the timer unit 29 stops the relay control output to the coil G1 and thereby switches the second switch C2 to the OFF state. In this manner, when the power cutoff switch 30 is switched to the ON state by the operation of the user or the like on the power cutoff switch 30, the relay control output from the timer unit 29 is stopped, the second switch C2 is switched to the OFF state, and the current supplying from the battery 27 to the position-measuring unit 21, the timer unit 29, and the communication module 25 is stopped.

The power cutoff switch 30 is operated not only when the work is completed. For example, the position-measuring unit 21 may not be able to accurately measure the current position and the current azimuth of the tractor 1, and it may be desired to measure the current position and the current azimuth of the tractor 1 by the position-measuring unit 21 again. In such a case, by operating the power cutoff switch 30, the current supplying from the battery 27 to the position-measuring unit 21, the timer unit 29, and the communication module 25 is stopped once, and then the position-measuring unit 21 can measure the current position and the current azimuth of the tractor 1 again.

Figure 7:
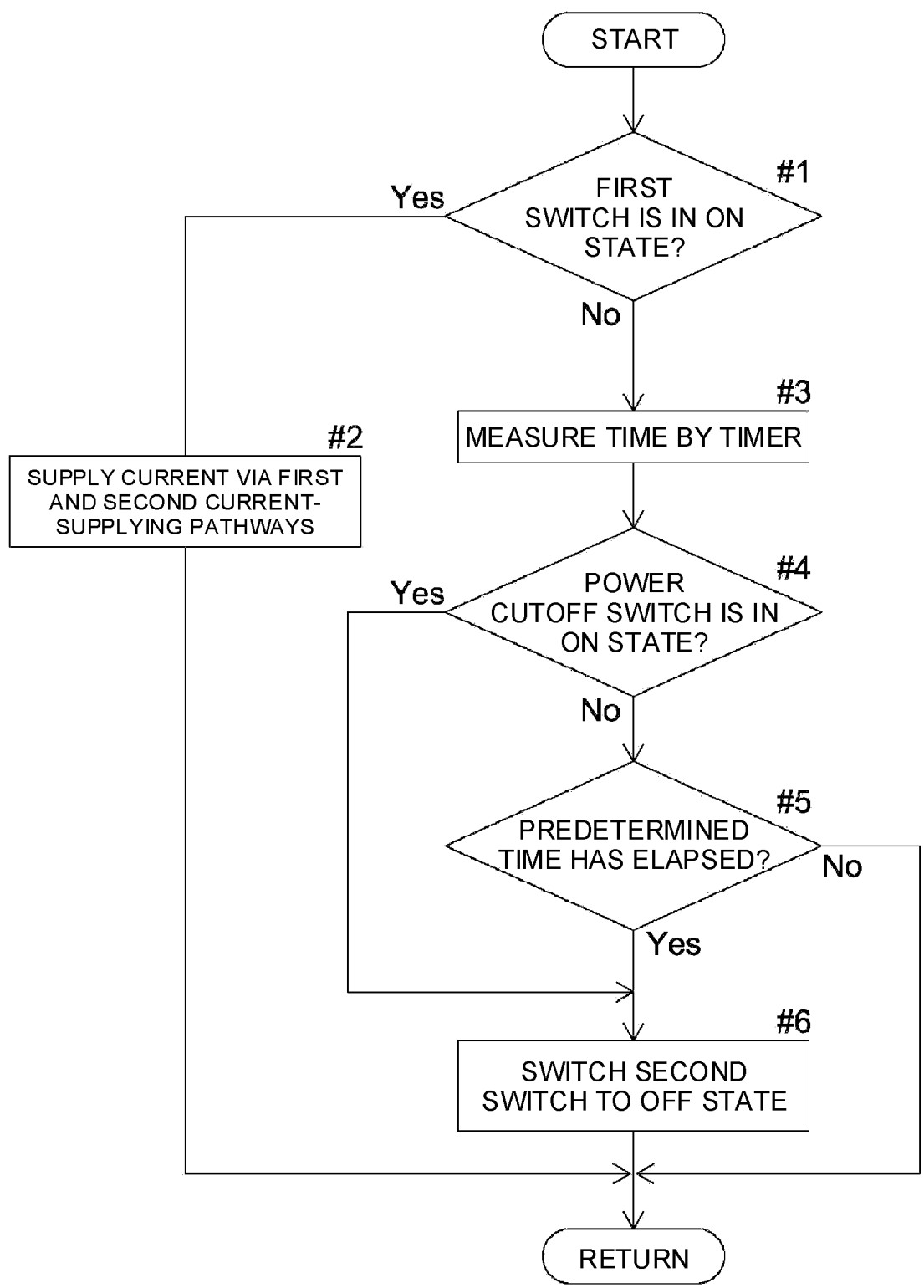
FIG. 7 is a flowchart illustrating an operation in the current-supplying circuit from the battery to the position-measuring unit.

The operation in the current-supplying circuit illustrated in FIG. 4 will be described with reference to the flowchart of FIG. 7. First, when the first switch C1 is in the ON state, as illustrated in FIG. 4, the current is supplied from the battery 27 to the position-measuring unit 21, each electrical component 28, the timer unit 29, and the communication module 25, via the first current-supplying pathway K1 and the second current-supplying pathway K2 (if Yes in step #1, step #2).

When the first switch C1 is switched from the ON state to the OFF state, the timer unit 29 performs timer measurement for measuring the time after the first switch C1 is turned to the OFF state (if No in step #1, step #3). If the power cutoff switch 30 is in the OFF state and a predetermined time has not elapsed since the first switch C1 was turned to the OFF state, the processing returns (if No in step #4, and if No step #5).

Even if the predetermined time has not elapsed since the first switch C1 was turned to the OFF state, when the power cutoff switch 30 is switched to the ON state, the second switch C2 is switched to the OFF state, and the current supplying from the battery 27 to the position-measuring unit 21, the timer unit 29, and the communication module 25 is stopped (if Yes in step #4, step #6).

In addition, even if the power cutoff switch 30 is not switched to the ON state, when a predetermined time has elapsed since the first switch C1 was turned to the OFF state, the second switch C2 is switched to the OFF state, and the current supplying from the battery 27 to the position-measuring unit 21, the timer unit 29, and the communication module 25 is stopped (if Yes in step #5, step #6).

Second Embodiment

Since this second embodiment is another embodiment of the current-supplying circuit in FIG. 4 of the first embodiment, a current-supplying circuit in the second embodiment will be described with reference to FIG. 8. The other configurations are the same as those in the first embodiment, and thus the description thereof will be omitted by denoting the same reference numerals and the like.

Figure 8:
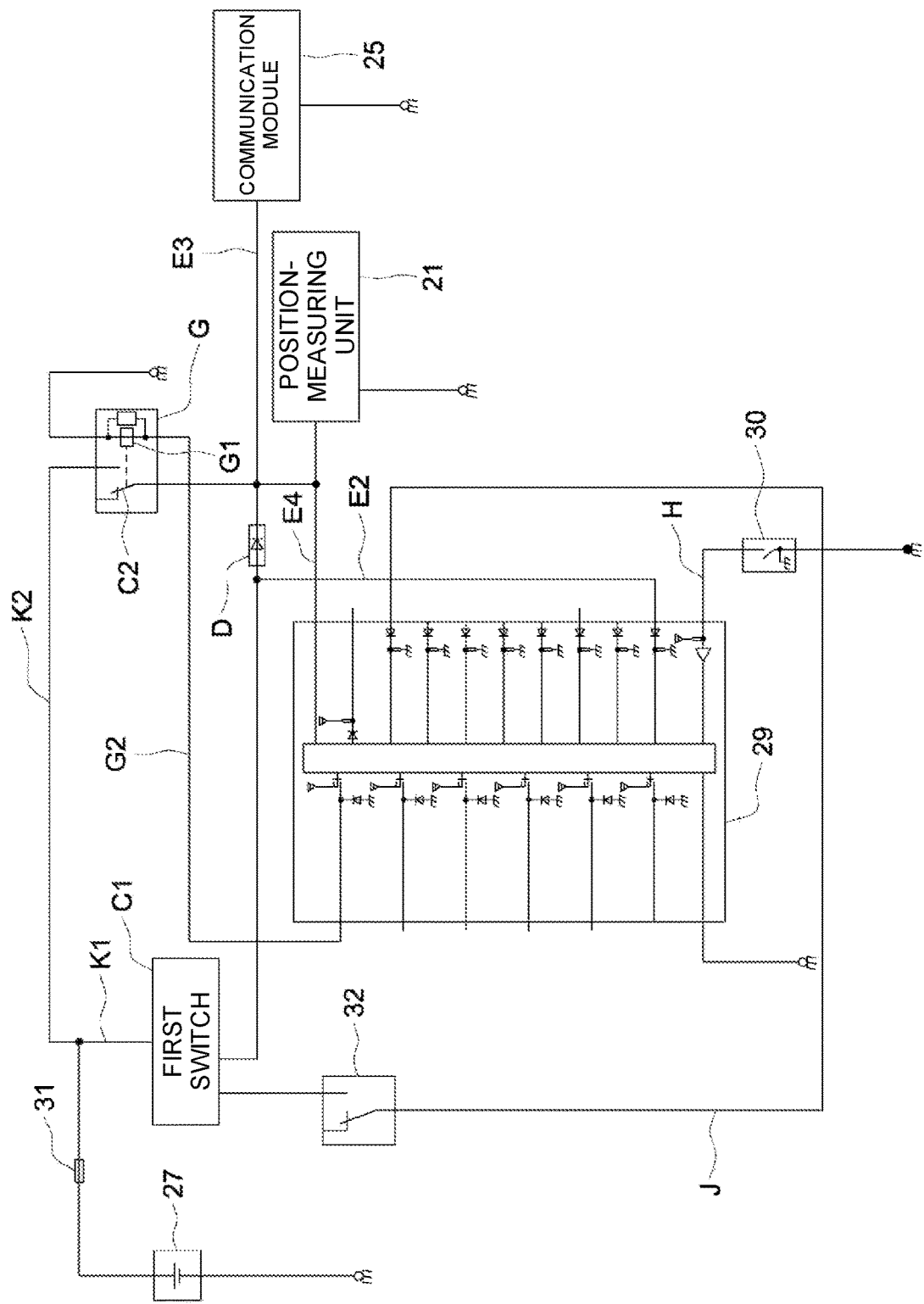
FIG. 8 is a diagram illustrating a current-supplying circuit from the battery to the position-measuring unit in a second embodiment.

As is the case with FIG. 4, FIG. 8 illustrates a current-supplying pathway from the battery 27 to various electrical components. Thus, the same reference numerals are given to the same configurations as in FIG. 4, and the description thereof will be omitted as appropriate. Basically, a configuration different from that of FIG. 4 will be described.

In the current-supplying circuit illustrated in FIG. 8, as is the case with FIG. 4, the first current-supplying pathway K1 for connecting the battery 27 and the position-measuring unit 21 is included. The second current-supplying pathway K2 is included in parallel with the first current-supplying pathway K1 while also serving as a part of the first current-supplying pathway K1. On the power supply side, in addition to the battery 27, a stabilized power supply 31 for stabilizing the power supply from the battery 27 is included. The stabilized power supply 31 is disposed between the battery 27 and the branch point of the second current-supplying pathway K2 in the first current-supplying pathway K1.

As is the case with FIG. 4, the current-supplying circuit illustrated in FIG. 8 includes the position-measuring unit 21, timer unit 29, communication module 25, and other electrical components (not illustrated) as electrical components for supplying electric power from the battery 27. Unlike FIG. 4, the second branch pathway E2 connected to the timer unit 29 is branched and connected from the upstream side of the diode D in the first current-supplying pathway K1, and a fourth branch pathway E4 is added to connect the timer unit 29 to the downstream side of the diode D. As a result, when the current is supplied from the battery 27 to the timer unit 29 in the first current-supplying pathway K1, the current is supplied from the battery 27 to the timer unit 29 via the first current-supplying pathway K1 and the second branch pathway E2. On the other hand, when the current is supplied from the battery 27 to the timer unit 29 in the second current-supplying pathway K2, the current is supplied from the battery 27 to the timer unit 29 via the second current-supplying pathway K2 and the fourth branch pathway E4.

The current-supplying circuit illustrated in FIG. 8 includes a safety switch 32 in a connection path J connecting the first switch C1 and the timer unit 29. This safety switch 32 is for prohibiting the start of the engine 9 unless the clutch disposed in the steering section of the cabin 10 is disengaged. The safety switch 32 is configured as a normally open switch that is always in the OFF state, and is switched to the ON state by disengaging the clutch. When the safety switch 32 is in the OFF state, even if the first switch (key switch) C1 is operated to the starting position of the engine 9, electric power is not supplied to the starter or the like, and the engine 9 cannot be started.

Other Embodiments

Other embodiments of the present invention will be described.

The configurations of the respective embodiments described below are not necessarily applied independently, but may be applied in combination with the configurations of the other embodiments.

(1) The configuration of the work vehicle can be changed in various ways.

For example, the work vehicle may be configured in a hybrid manner in which the engine 9 and an electric motor for traveling, or may be configured in an electroactuation manner in which an electric motor for traveling is included as an alternative to the engine 9.

For example, the work vehicle may be configured in a semi-crawler manner in which right and left crawlers are provided as a travel unit as an alternative to the right and left rear wheels 6.

For example, the work vehicle may be configured in a rear wheel steering manner in which the right and left rear wheels 6 function as steering wheels.

(2) In the above embodiments, while the condition for turning the second switch C2 to the OFF state is that a predetermined time elapses after the first switch C1 is turned to the OFF state, in addition, various conditions can be set, and a plurality of types of conditions can also be set.

For example, when generating a target travel route P for the tractor 1 to automatically travel, as illustrated in FIG. 3, in some cases, a point A and a point B are registered, a linear initial straight route connecting a point A and a point B is generated, a plurality of parallel routes parallel to the initial straight route are generated, and the target travel route P is thereby generated only from the work route P1. In this case, since the points A and B are registered when the automatic travel is performed, it can be determined that the automatic travel is not performed unless the points A and B are registered.

Accordingly, if the point A and the point B are registered, the second switch C2 can be turned to the ON state, and if the point A and point are not registered, the second switch C2 can be turned to the OFF state. The second switch C2 can be switched between the ON state and the OFF state depending on whether the point A and the point B are registered.

In this manner, the second switch C2 can be turned to the ON state when the automatic travel can be performed, and the second switch C2 can be turned to the OFF state when the automatic travel cannot be performed. The second switch C2 can be switched between the ON state and the OFF state depending on whether the vehicle is in a situation where the automatic travel can be performed.

In addition, when a work vehicle such as a tractor 1 is being transported on a truck or the like, the automatic travel is not performed. Thus, even in this case, the second switch C2 can be turned to the OFF state. In this case, even though the vehicle speed of the work vehicle is zero, the position information of the work vehicle acquired by the position-measuring unit 21 changes. Thus, from the vehicle speed of the work vehicle and the position information of the work vehicle acquired by the position-measuring unit 21, it can be determined whether the vehicle is being transported on a tractor or the like.

(3) In the above embodiments, the power cutoff switch 30 is disposed in the bonnet 8, but for example, it can be disposed in the steering section of the cabin 10 or displayed on the display unit 51 of the mobile communication terminal 3. The position at which the power cutoff switch 30 is disposed can be appropriately changed.

DESCRIPTION OF REFERENCE NUMERALS

1 tractor (work vehicle)
21 position-measuring unit
25 communication module (correction information communication device)
27 battery
28 each electrical component
29 timer unit
30 power cutoff switch (predetermined operation tool)
C1 first switch
C2 second switch
K1 first current-supplying pathway
K2 second current-supplying pathway

The invention claimed is:

1. An automatic travel system comprising:
a battery for power supply;
a position-measuring unit to acquire position information of a work vehicle with a use of a satellite positioning system; and
a current-supplying pathway to supply current from the battery to the position-measuring unit,
wherein the current-supplying pathway includes a first current-supplying pathway capable of supplying current from the battery to electrical components including the position-measuring unit via a first switch and a second current-supplying pathway capable of supplying current at least from the battery to the position-measuring unit via a second switch different from the first switch,
wherein when the first switch is in an ON state, the current is supplied from the battery to the position-measuring unit in both the first current-supplying pathway and the second current-supplying pathway, and
wherein when the first switch is in an OFF state, the current is supplied from the battery to the position-measuring unit by the second current-supplying pathway via the second switch in an ON state, but the current is prevented from being supplied to other predetermined electrical components.

2. The automatic travel system according to claim 1, wherein the second switch is turned to an OFF state after a predetermined time has elapsed since the first switch was turned to the OFF state, and the current supplying from the battery to the position-measuring unit by the second current-supplying pathway is stopped.

3. The automatic travel system according to claim 2, comprising a timer unit to measure the predetermined time after the first switch was turned to the OFF state and turn the second switch to the OFF state after the predetermined time has elapsed, wherein when the first switch is the ON state, the current is supplied from the battery to the timer unit in both the first current-supplying pathway and the second current-supplying pathway, and wherein when the first switch is in the OFF state, the current is supplied from the battery to the timer unit by the second current-supplying pathway via the second switch in the ON state.

4. The automatic travel system according to claim 1, wherein the second switch is turned to an OFF state on a basis of an operation on a predetermined operation tool, and the current supplying from the battery to the position-measuring unit by the second current-supplying pathway is stopped.

5. The automatic travel system according to claim 1, comprising a correction information communication device to communicate correction information for acquiring position information of the work vehicle, wherein when the first switch is in the ON state, the current is supplied from the battery to the correction information communication device in both the first current-supplying pathway and the second current-supplying pathway, and wherein when the first switch is in the OFF state, the current is supplied from the battery to the correction information communication device by the second current-supplying pathway via the second switch in the ON state.

* * * * *